United States Patent [19]

Niihara et al.

[11] Patent Number: 5,759,460
[45] Date of Patent: Jun. 2, 1998

[54] CERAMIC POROUS BODIES AND METHOD OF PRODUCING THE SAME

[75] Inventors: Koichi Niihara, Suita; Akira Yamakawa, Itami, both of Japan

[73] Assignee: Sumitomo Electric Industries, Ltd., Japan

[21] Appl. No.: 820,133

[22] Filed: Mar. 19, 1997

Related U.S. Application Data

[60] Continuation of Ser. No. 443,704, May 18, 1995, abandoned, which is a division of Ser. No. 381,966, filed as PCT/JP94/00941 Jun. 8, 1994, abandoned.

[30] Foreign Application Priority Data

Jun. 14, 1993 [JP] Japan ..................... 5-167506
Jun. 2, 1994 [JP] Japan ..................... 6-145425

[51] Int. Cl.$^6$ ..................... B29C 67/04
[52] U.S. Cl. ..................... 264/43; 264/65
[58] Field of Search ..................... 264/43, 65

[56] References Cited

U.S. PATENT DOCUMENTS

| | | | |
|---|---|---|---|
| 3,108,985 | 10/1963 | Weyer | 260/37 |
| 3,853,567 | 12/1974 | Verbeek | 106/44 |
| 3,892,583 | 7/1975 | Winter et al. | 106/55 |
| 4,404,153 | 9/1983 | Gaul, Jr. | 264/29.2 |
| 4,689,252 | 8/1987 | Lebrun et al. | 427/228 |
| 4,689,382 | 8/1987 | Lebrun et al. | 528/12 |
| 4,843,043 | 6/1989 | Nishio | 501/97 |
| 4,861,844 | 8/1989 | Lebrun et al. | 525/475 |
| 4,935,199 | 6/1990 | Nishio et al. | 419/36 |
| 5,073,330 | 12/1991 | Nishio et al. | 264/535 |
| 5,171,736 | 12/1992 | Seyferth et al. | 501/96 |
| 5,250,242 | 10/1993 | Nishio et al. | 264/60 |
| 5,283,019 | 2/1994 | Atwell et al. | 264/44 |

FOREIGN PATENT DOCUMENTS

| | | |
|---|---|---|
| 3-126669 | 5/1991 | Japan. |
| 4-231388 | 8/1992 | Japan. |
| 5-221742 | 8/1993 | Japan. |

*Primary Examiner*—Donald E. Czaja
*Assistant Examiner*—Sean Vincent
*Attorney, Agent, or Firm*—Wenderoth, Lind & Ponack

[57] ABSTRACT

A ceramic porous body composed principally of silicon carbide or silicon nitride which has higher strength, higher heat resistance and higher thermal shock resistance and has a large number of fine pores, and a method of producing the same. The ceramic porous body, comprised principally of silicon carbide or silicon nitride, has a pore diameter of not more than 1 μm, with a porosity of not less than 35%, and has a flexural strength of not less than 100 MPa. The ceramic porous body is produced by using a silicon oligomer which is capable of producing silicon carbide or silicon nitride when calcined, mixing the silicon oligomer with a silicon carbide powder or silicon nitride powder, and/or other ceramic powder which has a mean particle diameter of not more than 1.0 μm, molding the mixture into shape, then sintering the molding in a suitable atmosphere at temperatures of not less than 1200° C.

9 Claims, No Drawings

CERAMIC POROUS BODIES AND METHOD OF PRODUCING THE SAME

This is a continuation of application Ser. No. 08/443,704, filed May 18, 1995, now abandoned, which in turn is a divisional application of Ser. No. 08/381,966, filed Feb. 14, 1995, now abandoned, which is the National stage of PCT/JP94/00941, filed Jun. 8, 1994.

The present invention relates to a ceramic porous body having a large number of fine pores and high strength, and a method of producing the same.

BACKGROUND ART

Ceramic porous bodies are used in a wide range of applications, such as catalyst carriers, filters, and sensors, as well as in building materials, such as heat insulation material. Various materials for ceramic porous bodies are known including alumina, silicon carbide, aluminum silicate, silica, and cordierite, which are suitably selected for use according to the intended end use.

Recently, however, in applications such as filters and catalyst carriers, conventional ceramic porous bodies are experiencing difficulty in meeting the requirements for strength and heat resistance because the environments in which they are used are tending to become increasingly harsh due to factors such as increased stress applied and higher working temperatures.

For example, as an automotive exhaust gas cleaning catalyst carrier there has been put in practical use a honeycomb filter of cordierite which is produced by sintering a cordierite molding made by extrusion to a honeycomb configuration; but with such a catalyst carrier, further improvement is desired in its characteristics, such as strength, heat resistance and thermal shock resistance.

Silicon carbide and silicon nitride are known as examples of ceramics having high strength and high heat resistance, but at present there are only available for limited use porous bodies of such ceramics which have relatively large pores or have lower strength. For example, according to what is stated in "Powder and Powder Metallurgy", Vol. 38, No. 3, pp. 62–63, porous bodies of high strength have been produced by sintering a composite of SiC powder and polysilastyrene, but they are of about 1 µm in pore diameter, with a porosity of the order of 34%.

DISCLOSURE OF THE INVENTION

In view of such state of the prior art, therefore, it is an object of the present invention to provide a ceramic porous body which has higher strength, higher heat resistance, and higher thermal shock resistance and, in addition, contains a large number of fine pores, and also a method of producing the same.

In order to accomplish the above object, according to the invention there is provided a ceramic porous body which is composed principally of silicon carbide or silicon nitride and has a mean pore diameter of not more than 1 µm, a porosity of not less than 35%, and a flexural strength of not less than 100 MPa.

Such a ceramic porous body is produced by using a silicon oligomer which is capable of producing silicon carbide or silicon nitride when calcined, mixing the silicon oligomer with a silicon carbide powder or silicon nitride powder and/or other ceramic powder which has a mean particle diameter of not more than 10 µm, molding the mixture into shape, then sintering the molding in a suitable atmosphere at temperatures of not less than 1200° C.

Specifically, a method of producing a ceramic porous body composed principally of silicon carbide comprises admixing a silicon carbide powder having a mean particle diameter of not more than 1.0 µm with 1 to 99% by weight of a silicon oligomer containing carbon atoms in terms of silicon content, molding the mixture into shape, then sintering the molding in a non-oxidative atmosphere at temperatures of not less than 1200° C., preferably 1500° to 1900° C.

Where silicon carbide powder is not used, a ceramic porous body composed principally of silicon carbide may be produced by admixing a silicon oligomer containing carbon atoms with 1 to 40% by weight, preferably 10 to 30% by weight, of a ceramic powder, other than silicon carbide, having a mean particle diameter of not more than 1.0 µm, molding the mixture into shape, then sintering the molding in a non-oxidative atmosphere at temperatures of not less than 1200° C., preferably 1500° to 1900° C.

A method of producing a ceramic porous body composed principally of silicon nitride comprises admixing a silicon nitride powder having a mean particle diameter of not more than 1.0 µm with 1 to 99% by weight of a silicon oligomer containing carbon atoms in terms of silicon content, molding the mixture into shape, then sintering the molding in a nitrogen atmosphere or an inert atmosphere containing nitrogen at temperatures of not less than 1200° C., preferably 1500° to 1900° C.

Where silicon nitride powder is not used, a ceramic porous body composed principally of silicon nitride may be produced by admixing a silicon oligomer containing carbon atoms with 1 to 40% by weight, preferably 10 to 30% by weight, of a ceramic powder, other than silicon nitride, having a mean particle diameter of not more than 1.0 µm, molding the mixture into shape, then sintering the molding in a nitrogen atmosphere or an inert atmosphere containing nitrogen at temperatures of not less than 1200° C., preferably 1500° to 1900° C.

Best Mode For Carrying Out The Invention

A ceramic porous body in accordance with the present invention is composed principally of silicon carbide (SiC) or silicon nitride ($Si_3N_4$), and in some case it may contain silicon carbonitride. Where so required, it may contain other ceramic components and some residue of a sintering aid, carbon, etc. Although SiC and $Si_3N_4$ are materials having high strength and high heat resistance, hitherto there have been known only porous bodies of such material which are of the type having relatively large pores and low strength.

In contrast, the porous body of the invention has a large number of fine open pores with a pore diameter of not more than 1 µm, and has a large surface area. This, coupled with a high degree of porosity, i.e., not lower than 35%, permits passage of fluid, such as gas, at a higher rate. Therefore, the porous body is able to function well in applications, such as filters and catalyst carriers. Further, the porous body has high flexural strength on the order of 100 MPa or more, which makes the porous body highly reliable for use as structural material.

The ceramic porous body of the invention can be produced in several ways. Essentially, it may be produced by using a silicon oligomer which is capable of producing SiC or $Si_3N_4$ when calcined, mixing the same with an SiC powder or $Si_3N_4$ powder, and/or other ceramic powder which has a mean particle diameter of not more than 1.0 µm, molding the mixture into shape, then sintering the molding in a suitable atmosphere at temperatures of not less than 1200° C., preferably 1500° C. to 1900° C. If the sintering temperature is lower than 1200° C., the resulting sintered body is of low strength. In order to obtain a product of higher strength, the sintering temperature is preferably 1500° C. or higher. If the temperature is higher than 1900° C., there will result an excessively large pore diameter or a sintered body having lower strength.

The term "silicon oligomer" refers to a low polymer of an organic silicon compound. In particular, silicon oligomers useful in the practice of the method of the invention which are capable of producing SiC or $Si_3N_4$ are those in which the main chain or side chains do not contain other than carbon, hydrogen and silicon. For example, polycarbosilane, polysilazane, and polysilastyrene are preferred as such. Any polysiloxane in which the main chain or side chains contain oxygen is undesirable for use because no sufficient conversion to SiC or $Si_3N_4$ can be effected. When silicon oligomer is calcined in an inert atmosphere of Ar or the like, there will be mainly produced SiC, while $Si_3N_4$ is mainly produced when silicon oligomer is calcined in a nitrogen atmosphere. However, any SiC or $Si_3N_4$ as produced from silicon oligomer alone has no sufficient strength and presents relatively large pores.

Therefore, according to the method of the invention, such silicon oligomer is mixed with fine SiC powder or $Si_3N_4$ powder, and/or other ceramic powder, whereby a porous body composed principally of SiC or $Si_3N_4$ can be obtained which has a large number of fine pores with a pore diameter of not more than 1 μm and a porosity of not less than 35%, and which has a flexural strength of not less than 100 MPa. In order to produce a porous body having such fine pores and high strength, it is required that the ceramic powder to be mixed with the silicon oligomer should be of not more than 1.0 μm in mean particle diameter.

The method of the invention will be described in further detail for each principal component of such porous body. The method of producing a porous body composed principally of SiC, in essence, comprises mixing silicon oligomer and SiC powder together, and sintering a molding of the mixture in a non-oxidative atmosphere. The non-oxidative atmosphere may be of an inert gas, such as Ar, nitrogen gas, hydrogen gas, or a mixture gas thereof. It is noted, however, that where nitrogen gas is used, SiCN, $Si_3N_4$ and the like may be produced in addition to SiC. In place of a portion of SiC powder, other ceramic powder may be added in an amount of not more than 40% by weight, preferably 10 to 30% by weight, based on the total powder weight. The term "other ceramic powder" refers to powder other than SiC, which may be a nitride, such as $Si_3N_4$, TiN, or AlN; an oxide, such as $Al_2O_3$, $SiO_2$, or $ZrO_2$; or a carbide, such as TiC, WC, or ZrC.

The method of producing a porous body composed principally of $Si_3N_4$, in essence, comprises mixing silicon oligomer and $Si_3N_4$ powder together, and sintering a molding of the mixture in a nitrogen atmosphere or an inert atmosphere containing nitrogen. For the inert atmosphere, an inert gas, such as Ar, is used. It is noted, however, that since silicon oligomer contains carbon, SiCN, SiC or the like may be produced simultaneously with production of $Si_3N_4$. In place of a part of the $Si_3N_4$ powder, other ceramic powder may be added in an amount of not more than 40% by weight, preferably 10 to 30% by weight, based on the total powder weight. The term "other ceramic powder" refers to powder other than $Si_3N_4$, which may be a nitride, such as AlN or TiN; an oxide, such as $Al_2O_3$, $SiO_2$, or $ZrO_2$; or a carbide, such as SiC or TiC.

In both of the above two methods, the proportion of silicon oligomer is 1 to 99% by weight in terms of silicon content. If the proportion of silicon oligomer is less than 1% by weight in terms of Si content, the porosity is rendered small. If the proportion is more than 99% by weight, the strength of the porous body is extremely lowered. The silicon oligomer acts as a forming binder and also functions as a sintering aid. In the method of the invention, therefore, any conventional type of binder or sintering aid need not necessarily be used.

Porous bodies of the invention may be produced without using SiC powder or $Si_3N_4$. In this case, the method of the invention comprises admixing a silicon oligomer containing carbon atoms with 1 to 40% by weight of a ceramic powder other than SiC or $Si_3N_4$ which has a mean particle diameter of not more than 1.0 μm, molding the mixture into shape, then sintering the molding in a non-oxidative atmosphere where the porous body being produced is one composed principally of SiC, or in a nitrogen atmosphere or an inert atmosphere containing nitrogen where the porous body being produced is one composed principally of $Si_3N_4$, at temperatures of not less than 1200° C., preferably 1500° to 1900° C.

Where this method is employed, the ceramic powder used is other than SiC powder or $Si_3N_4$ powder. If the proportion of the ceramic powder is less than 1% by weight relative to the total powder weight, the resulting porous body is of lower strength. If the proportion is more than 40% by weight, the thermal shock resistance of the porous body will be low and, at same time, the porosity of the porous body will be small. Therefore, the proportion of the ceramic powder is within the range of 1 to 40% by weight.

According to the above described method of the invention, sintering can be effected at lower temperatures as compared with the prior art method in which silicon oligomer is not used. The resulting porous body involves less residue of silicon (Si) and/or carbon (C) and is of high purity despite the fact that it contains SiC or $Si_3N_4$ as produced from the silicon oligomer. Therefore, the porous body has good flexural strength, high heat resistance, and high thermal shock resistance. The SiC or $Si_3N_4$ produced from the silicon oligomer may be either crystalline or non-crystalline.

In the method of the invention, the atmosphere during the sintering stage may be under normal pressure, but it is preferable that the atmosphere be pressurized to 50 atmospheres or more so that sintering is accelerated while pores of the work are maintained as such, it being thus possible to obtain a porous body having higher strength characteristics. It is noted in this connection that while the pressure applied is desirably higher, it should be limited to 2000 atmospheres from the standpoint of manufacturing cost. In proportion as the SiC powder or $Si_3N_4$ powder, and/or other ceramic powder to be added is made smaller in particle diameter, the ceramic porous body to be obtained can be rendered finer in pore diameter. For example, where a powder having a mean particle diameter of not more than 0.05 μm is used, a sintered porous body having a pore diameter of not more than 0.01 μm may be obtained. Therefore, it is very important to select a suitable particle size with respect to respective ceramic powders to be added.

(Example 1) Using the silicon oligomers and ceramic powders as shown in Tables 1 and 2 were produced porous bodies composed principally of SiC and porous bodies composed principally of $Si_3N_4$, respectively. That is, silicon oligomers and ceramic powders were mixed in such combinations as shown in Tables 1 and 2, and the respective mixtures were each molded to a plate-like shape having a length of 30 mm, a width of 30 mm, and a thickness of 3 mm. Then, the respective moldings were sintered for one hour under the sintering conditions shown in Tables 1 and 2. In Tables 1 and 2, mixing proportions (wt. %) of silicon oligomers are values expressed in terms of Si content.

TABLE 1

| SiC Porous Body | Mixing Proportion (wt. %) | | | Sintering Conditions | |
|---|---|---|---|---|---|
| | Silicon oligomer | | Ceramic powder (mean particle size) | Temp. (°C.) | Atmosphere (atm.) |
| 1 | Polysilastyrene | 95 | SiC (0.5 µm) | 5 | 1600 | Ar (500 atm) |
| 2 | Polysilastyrene | 70 | SiC (0.3 µm) | 30 | 1600 | Ar (500 atm) |
| 3 | Polycarbosilane | 90 | SiC (0.5 µm) | 10 | 1600 | Ar (500 atm) |
| 4 | Polysilazane | 90 | SiC (0.5 µm) | 10 | 1600 | Ar (500 atm) |
| 5 | Polysilastyrene | 70 | SiC (0.5 µm) | 30 | 1800 | Ar (500 atm) |
| 6 | Polysilastyrene | 70 | SiC (0.5 µm) | 30 | 1600 | Ar (50 atm) |
| 7 | Polysilastyrene | 80 | Al₂O₃ (0.7 µm) | 20 | 1600 | Ar (50 atm) |
| 8 | Polysilastyrene | 80 | Si₃N₄ (0.5 µm) | 20 | 1700 | Ar (100 atm) |
| 9 | Polysilastyrene | 80 | Si₃N₄ (0.5 µm) | 20 | 1600 | N₂ (500 atm) |
| 10 | Polysilastyrene | 70 | SiC (0.5 µm) | 30 | 1600 | Ar (500 atm) |
| 11 | Polysilastyrene | 30 | SiC (0.5 µm) | 70 | 1250 | Ar (1 atm) |
| 12 | Polysilastyrene | 20 | SiC (0.5 µm) | 80 | 1800 | Ar (2 atm) |
| 13 | Polysilastyrene | 5 | SiC (0.5 µm) | 95 | 1600 | Ar (500 atm) |
| 14* | Polysilastyrene | 100 | — | | 1400 | N₂ (2 atm) |
| 15* | Polycarbosilane | 50 | Al₂O₃ (0.7 µm) | 50 | 1800 | Ar (2 atm) |
| 16* | Polysilastyrene | 0.1 | SiC (0.5 µm) | 99.9 | 1600 | Ar (500 atm) |
| 17* | Polysilastyrene | 99.9 | SiC (0.5 µm) | 0.1 | 1600 | Ar (500 atm) |
| 18* | Polysilastyrene | 80 | SiC (0.5 µm) | 20 | 2000 | Ar (500 atm) |

(Note):
Samples bearing the mark * are represent comparative examples.

TABLE 2

| SiC Porous Body | Mixing Proportion (wt. %) | | | Sintering Conditions | |
|---|---|---|---|---|---|
| | Silicon oligomer | | Ceramic powder (mean particle size) | Temp. (°C.) | Atmosphere (atm.) |
| 19 | Polysilastyrene | 95 | Si₃N₄ (0.5 µm) | 5 | 1550 | N₂ (500 atm) |
| 20 | Polysilastyrene | 70 | Si₃N₄ (0.3 µm) | 30 | 1550 | N₂ (500 atm) |
| 21 | Polycarbosilane | 90 | Si₃N₄ (0.5 µm) | 10 | 1550 | N₂ (500 atm) |
| 22 | Polysilazane | 90 | Si₃N₄ (0.5 µm) | 10 | 1550 | N₂ (500 atm) |
| 23 | Polysilastyrene | 70 | Si₃N₄ (0.5 µm) | 30 | 1800 | N₂ (500 atm) |
| 24 | Polysilastyrene | 70 | Si₃N₄ (0.5 µm) | 30 | 1600 | N₂ (50 atm) |
| 25 | Polysilastyrene | 80 | Al₂O₃ (0.7 µm) | 20 | 1550 | N₂ (50 atm) |
| 26 | Polysilastyrene | 80 | Si₃N₄ (0.5 µm) | 20 | 1700 | N₂ (100 atm) |
| 27 | Polysilastyrene | 80 | Si₃N₄ (0.5 µm) | 20 | 1600 | N₂ + Ar (100 atm) |
| 28 | Polysilastyrene | 70 | SiC (0.5 µm) | 30 | 1600 | N₂ (500 atm) |
| 29 | Polysilastyrene | 30 | Si₃N₄ (0.1 µm) | 70 | 1200 | N₂ (1 atm) |
| 30 | Polysilastyrene | 20 | Si₃N₄ (0.5 µm) | 80 | 1800 | N₂ + Ar (2 atm) |
| 31 | Polysilastyrene | 5 | Si₃N₄ (0.5 µm) | 95 | 1550 | N₂ (500 atm) |
| 32* | Polysilastyrene | 100 | — | | 1400 | N₂ (2 atm) |
| 33* | Polycarbosilane | 50 | Al₂O₃ (0.7 µm) | 50 | 1800 | N₂ (2 atm) |
| 34* | Polysilastyrene | 0.1 | Si₃N₄ (0.5 µm) | 99.9 | 1550 | N₂ (500 atm) |
| 35* | Polysilastyrene | 99.9 | Si₃N₄ (0.5 µm) | 0.1 | 1600 | N₂ (500 atm) |
| 36* | Polysilastyrene | 80 | Si₃N₄ (0.5 µm) | 20 | 2000 | N₂ (500 atm) |

(Note):
Samples bearing the mark * are represent comparative examples.

For each porous body obtained, porosity was measured, and also pore diameter measurement was made by using a scanning electron microscope (SEM). With a sample of 4 mm×2 mm×30 mm cut from each porous body, measurement was made of three-point bending strength over a span of 20 mm. The measurement results are shown in Tables 3 and 4.

The porous bodies were all found as having good oxidation resistance in the atmosphere at 1000° C. Then, each porous body was locally heated to ignition by a natural gas burner for observation as to whether cracking would occur or not, whereby the porous body was evaluated as to its thermal shock resistance. For comparison purposes, similar measurements were made with conventional Al₂O₃ and SiC porous bodies, and Cerafoam which are commercially available. The measurement results are also shown in Tables 3 and 4.

TABLE 3

| SiC Porous Body | Porosity (%) | Mean Pore Size (µm) | Flexural Strength (MPa) | Thermal Shock Resistance Crack found or not |
|---|---|---|---|---|
| 1 | 45 | <1 | 250 | No |
| 2 | 40 | <0.5 | 400 | No |
| 3 | 48 | <1 | 150 | No |
| 4 | 50 | <0.5 | 170 | No |
| 5 | 45 | <1 | 300 | No |
| 6 | 40 | <0.5 | 200 | No |
| 7 | 40 | <1 | 200 | No |
| 8 | 55 | <0.5 | 300 | No |
| 9 | 58 | <0.5 | 200 | No |
| 10 | 52 | <0.5 | 350 | No |
| 11 | 55 | <0.5 | 150 | No |
| 12 | 35 | <1 | 250 | No |
| 13 | 40 | <0.5 | 350 | No |
| 14* | 55 | 2~5 | 50 | Yes |
| 15* | 8 | <0.5 | 400 | Yes |
| 16* | 10 | <0.5 | 400 | No |
| 17* | 50 | <0.5 | 80 | Yes |
| 18* | 40 | 1 | 150 | No |
| Commercial Al₂O₃* | 45 | 2~5 | 50 | Yes |

TABLE 3-continued

| SiC Porous Body | Porosity (%) | Mean Pore Size (μm) | Flexural Strength (MPa) | Thermal Shock Resistance Crack found or not |
| --- | --- | --- | --- | --- |
| Commercial SiC* | 30 | 2–10 | 400 | Yes |
| Cerafoam* | 70 | >10 | 5 | Yes |

(Note):
Samples bearing the mark * represent comparative examples.

TABLE 4

| SiC Porous Body | Porosity (%) | Mean Pore Size (μm) | Flexural strength (MPa) | Thermal Shock Resistance Crack found or not |
| --- | --- | --- | --- | --- |
| 19 | 48 | <1 | 200 | No |
| 20 | 45 | <0.5 | 350 | No |
| 21 | 49 | <1 | 150 | No |
| 22 | 53 | <0.5 | 170 | No |
| 23 | 49 | <1 | 250 | No |
| 24 | 42 | <0.5 | 200 | No |
| 25 | 44 | <1 | 180 | No |
| 26 | 56 | <0.5 | 220 | No |
| 27 | 58 | <0.5 | 160 | No |
| 28 | 55 | <0.5 | 300 | No |
| 29 | 58 | <0.5 | 160 | No |
| 30 | 35 | <1 | 250 | No |
| 31 | 42 | <0.5 | 300 | No |
| 32* | 56 | 2–5 | 50 | Yes |
| 33* | 8 | <0.5 | 300 | Yes |
| 34* | 10 | <0.5 | 350 | No |
| 35* | 50 | <0.5 | 50 | Yes |
| 36* | 40 | 1 | 150 | No |
| Commercial Al$_2$O$_3$* | 45 | 1–5 | 50 | Yes |
| Commercial SiC* | 30 | 2–10 | 400 | Yes |
| Cerafoam* | 70 | >10 | 5 | Yes |

(Note):
Samples bearing the mark * represent comparative examples.

(Example 2) Sample Nos. 2 and 19, SiC and Si$_3$N$_4$ porous bodies, in Example 1 were subjected to penetration by diesel engine combustion gas at 1000° C. As a result, it was found that capture ratio exceeded 90% with respect to solid content of fine carbon particles and the like, and that there was no thermal damage occurrence. For comparison purposes, gas penetration tests were made with commercial porous bodies composed respectively of Al$_2$O$_3$, cordierite, and SiC. With all these porous bodies, capture ratio was not more than 50% and, in addition, there occurred damages (cracks) due to heating. This tells that they can never withstand use conditions.

From the foregoing data, it is apparent that the ceramic porous body of the present invention has good advantage over conventional ceramic porous bodies, not only in separation performance for filter service, but also in heat resistance and thermal shock resistance.

Therefore, it is believed that the ceramic porous body is an industrially useful material.

From the foregoing results of Examples 1 and 2, it can be seen that the ceramic porous body of the invention is a highly porous material with fine pores and high porosity and, in addition, has excellent heat resistance, thermal shock resistance and oxidation resistance.

Industrial Applicability

According to the invention, a ceramic porous body can be provided which is composed principally of silicon carbide or silicon nitride and has higher strength, higher heat resistance and higher thermal shock resistance than any conventional one, and which has large porosity with a large number of fine pores.

We claim:

1. A method of producing a ceramic porous body which comprises admixing a silicon carbide powder having a mean particle diameter of not more than 1.0 μm with 1 to 99% by weight of a silicon oligomer containing carbon atoms in terms of silicon content, molding the mixture into shape, then sintering the molding in a non-oxidative atmosphere at temperatures of not less than 1200° C.

2. A method of producing a ceramic porous body as set forth in claim 1, wherein in place of a portion of the silicon carbide powder another ceramic powder, different than that of the silicon carbide powder, is added in an amount of not more than 40% by weight, based on the total powder weight, said different ceramic powder having a mean particle size not more than 1.0 μm.

3. A method of producing a ceramic porous body which comprises admixing a silicon nitride powder having a mean particle diameter of not more than 1.0 μm with 1 to 99% by weight of a silicon oligomer containing carbon atoms in terms of silicon content, molding the mixture into shape, then sintering the molding in a nitrogen atmosphere or an inert atmosphere containing nitrogen at temperatures of not less than 1200° C.

4. A method of producing a ceramic porous body as set forth in claim 3, wherein in place of the silicon nitride powder another powder, different from that of the silicon nitride powder, is added to the silicon nitride powder in an amount of not more than 40% by weight based on the total powder weight.

5. A method of producing a ceramic porous body which comprises mixing a silicon oligomer containing carbon atoms and 1 to 40% by weight of al$_2$O$_3$ which has a mean particle diameter of not more than 1.0 μm, molding the mixture into shape, then sintering the molding in a non-oxidative atmosphere at temperatures of not less than 1200° C.

6. A method of producing a ceramic porous body which comprises mixing a silicon oligomer containing carbon atoms and 1 to 40% by weight of Al$_2$O$_3$ which has a mean particle diameter of not more than 1.0 μm, molding the mixture into shape, then sintering the molding in a nitrogen atmosphere or an inert atmosphere containing nitrogen at temperatures of not less than 1200° C.

7. A method of producing a ceramic porous body as set forth in any one of claims 1 to 6, wherein the sintering atmosphere is pressurized to 50 atmospheres or more.

8. A method of producing a ceramic porous body as set forth in any one of claims 1 to 6, wherein the silicon oligomer is polycarbosilane, polysilazane, or polysilastyrene.

9. A method of producing a ceramic porous body according to claims 1, 3, 5 or 6 wherein the ceramic porous body, thus produced, has a flexural strength not less than 100 MPa and a porosity of not less than 35%.

* * * * *